United States Patent [19]
Enzmann et al.

[11] Patent Number: 5,690,577
[45] Date of Patent: *Nov. 25, 1997

[54] GEAR MECHANISM

[75] Inventors: Bernd Enzmann, Villingen-Schwenningen; Hansjörg Maus, Donaueschingen, both of Germany

[73] Assignee: IMS Morat Söhne GmbH, Germany

[*] Notice: The term of this patent shall not extend beyond the expiration date of Pat. No. 5,551,927.

[21] Appl. No.: 603,410

[22] Filed: Feb. 20, 1996

Related U.S. Application Data

[63] Continuation-in-part of Ser. No. 280,237, Jul. 25, 1994, Pat. No. 5,551,927.

[51] Int. Cl.⁶ ............................................. F16H 57/00
[52] U.S. Cl. ............................................. 475/265
[58] Field of Search ............................ 464/39; 475/265

[56] References Cited

U.S. PATENT DOCUMENTS

| | | | |
|---|---|---|---|
| 2,176,928 | 10/1939 | Short | 464/39 |
| 3,079,814 | 3/1963 | Nickstadt | 475/265 |
| 3,587,346 | 6/1971 | Takahashi | 475/265 |
| 3,752,278 | 8/1973 | States | 464/39 |
| 4,597,453 | 7/1986 | Kilmer et al. | 173/171 |
| 4,614,134 | 9/1986 | Bohle | 475/265 |
| 4,635,489 | 1/1987 | Immamura et al. | 475/265 |
| 4,641,551 | 2/1987 | Pascaloff | 475/265 |
| 5,551,927 | 9/1996 | Enzmann et al. | 475/265 |

FOREIGN PATENT DOCUMENTS

| | | | |
|---|---|---|---|
| 3121100A1 | 12/1982 | Germany | B65B 13/00 |
| 3614260A1 | 10/1987 | Germany | B29C 45/14 |
| 3323251 | 2/1990 | Germany | E21C 24/34 |
| 3832692A1 | 3/1990 | Germany | F16K 25/00 |
| 41233490C1 | 3/1993 | Germany | B25B 23/157 |

*Primary Examiner*—Dirk Wright
*Attorney, Agent, or Firm*—Stein, Pendorf & Van Der Wall

[57] ABSTRACT

A conventional gear mechanism for employment in, e.g., an accumulator driven electric bore machine or electric drill, is provided with an overload coupling provided with a lightweight plastic annular gear and a separate metal cam disk or guard plate which protects the plastic annular gear from the abrasive or damaging forces occurring at the time of the torque limiting produced by the slipping of the torque overload coupling. In the present invention the plastic annular gear and guard plate are formed as a single component, namely, a plastic annular gear with an integral wear resistant cam disk, the annular gear and cam disk formed as unit of an injection molded plastic, wherein the face side of the annular gear is layered with a wear resistant material.

13 Claims, 4 Drawing Sheets

GEAR MECHANISM

This application is a continuation-in-part of Ser. No. 08/280,237 Jul. 25, 1994 now U.S. Pat. No. 5,551,927.

BACKGROUND OF THE INVENTION

1. Field of the Invention

The invention concerns a gear mechanism with a variable overload coupling for limitation of the rotational moment in, for example, an accumulator driven electro-bore machine or electric drill as is known, for example from the German Patent Application P 43 24 876.4. In comparison to the therein described overload coupling provided with a separate metal cam disk or guard plate which protects the plastic annular gear, the coupling according to the present invention comprises a plastic annular gear with an integral wear resistant cam disk formed as unit of an injection molded plastic, wherein the face side of the annular gear is layered with a wear resistant material.

2. Description of the Related Art

The gear mechanism described in P 43 24 876.4 is comprised of an overload coupling with an annular gear of plastic, wherein a guard plate, preferably a metallic cam plate, is provided between the annular gear and the spring device pressing axially on the annular gear. The material of the guard plate must, in accordance with the invention, have a greater structural stability and hardness than the annular gear. The guard plate or, as the case may be, cam plate, in accordance with the invention is mounted non-rotatingly on the annular gear, so that the pressure force of the spring can act axially on the face side of the annular gear through the guard plate or, as the case may be, cam plate, and that nevertheless the frictional forces occurring at the time of the torque limiting act directly on the guard plate or, as the case may be, cam plate. In this way the relatively soft face side of the plastic annular gear is effectively protected against the abrasive or damaging forces produced by the slipping of the torque overload coupling.

A further advantage of the construction of the described gear mechanism is in the quietness of the running noise. The reason for this lies in that, in accordance with the invention, the plastic gear wheels of the planetary gears mesh with the plastic inner gearing of the annular gear, and upon overload the plastic annular gear rubs against the inner wall of the likewise of plastic constructed gear housing, whereby like materials come into moving contact with each other. In other conventional gear mechanisms on the other hand, the annular gear which is constructed of metal contacts the metal toothed gears of the planetary gear, so that a comparatively higher running noise is generated as compared to the gear mechanism according to the invention.

In a further development of the gear mechanism as disclosed in P 43 24 876.4, the guard plate or as the case may be cam plate is provided removably seated on the annular gear in a non-rotating manner with respect the annular gear. The primary advantage of such a further development is that upon wearing out of the guard plate or, as the case may be, cam plate, it is not necessary to replace the entire annular gear, but rather only the guard plate or, as the case may be, cam plate.

For the removable attachment of the guard plate or, as the case may be, cam plate, and annular gear the annular gear is provided on it's face side with recesses and the guard plate or, as the case may be, cam plate, is provided with protrusions which are received in the recesses of the annular gear and there secure the guard plate or, as the case may be, cam plate, in a non-slip relation to the running direction of the annular gear. In this way it is ensured, that in the non-moving annular gear, that is, during a torque transmission from the drive shaft to the output shaft at less than the above-discussed torque overloading, also the guard plate or, as the case may be, cam plate, is at rest.

The metallic cam plate is preferably comprised of a very ductile and malleable metal, so that the metallic cam plate can be easily produced by means of a stamping process. The cam plate can thus be formed as a simple stamped part, and the production can be substantially simplified.

This annular gear is comprised in a preferred embodiment of an injection moldable thermoplastic, which has a sufficient mechanical stability. As injection moldable thermoplastic materials there can be mentioned, for example, a polyamide 6.6 with mineral fillers.

A particularly easy to assemble embodiment of the gear mechanism is comprised of a spring installation in the form of a pressure spring, which by means of a fixed pressure ring imparts axial pressure to the metallic cam disk and thereby to the annular gear. The cam disk and the pressure ring are positioned with flat surfaces facing each other. For increasing of the frictional forces the surfaces of the pressure disk and cam disk facing each other are provided with wedge- or engaging-elements, preferably as projections arranged in a ring on the pressure ring or on the cam disk. The pressure ring is comprised in a preferred embodiment of a very ductile and malleable metal just like the metal cam disk, so that it also can be produced in a simple way by means of a stamping process using a metal blank.

In a further preferred embodiment of the invention the annular ring is provided with at least one planetary gear which is carried on a planetary gear carrier, which meshes with a drive shaft, whereby the planetary gear carrier is provided with a bulge-like reinforcement in an area lying opposite the distal end of a drill spindle of the planetary gear carrier. As a result of this kind of strengthening of the planetary gear carrier the above-discussed torque loading can be increased, without it resulting in a breaking of the planetary gear carrier or, as the case may be, drill spindle of the planetary gear carrier during operation. Thus a greater torque transfer from the drive shaft to the output shaft can occur, without there being need to resort to the overload coupling.

In a further embodiment the planetary gear is constructed in two stages with respectively different reductions or step-down gearing and the annular gear is provided with an internal gearing which is adapted to meshing with both stages. This makes possible a variable reduction of the gear at differing torque loads.

For the construction of a lubrication reservoir between the annular gear and the gear housing the gear housing is provided with a cylinder shaped inner wall for receiving of the annular gear, and the inner wall is partially conically shaped. The sections of the inner wall running parallel to each other serve during assembly of the gear mechanism according to the invention for a good alignment guiding and a good subsequent seating of the annular gear within the gear housing, while the conical sections of the inner wall and the annular gear result in the formation of a cleft in which reception of lubricant is possible. Beyond that, the gear housing which is conventionally formed of plastic is easier to extract from the mold due to it's conical section.

This gear is particularly suitable for use in an accumulator driven electric drill or, as the case may be, electric screw driver tool. As a result of the fact that most of the parts employed in the gear mechanism are made of plastic, such an accumulator driven electric drill or as the case may be electric screw driver tool is characterized by a relatively light weight. In comparison to the conventional accumulator driven electric drill or, as the case may be, electric screw driver tools, this weight is further reduced by the employment of an annular gear which is made of a plastic.

The present invention is concerned with the task of further developing the gear mechanism as known from German Patent Application P 43 24 876.4, so that the assembly expenditure is reduced.

This task is solved by a gear mechanism with the characteristics as set forth in claim 1.

SUMMARY OF THE INVENTION

The problem is solved by a gear mechanism wherein the overload coupling is not provided with a separate metal cam disk or guard plate which protects the plastic annular gear, but rather the coupling includes a plastic annular gear with an integral wear resistant cam disk, the annular gear and cam disk formed as unit of an injection molded plastic, wherein the face side of the annular gear is layered with a wear resistant material.

The one piece construction of the guard plate and annular gear in accordance with the invention minimizes in particular the assembly cost during the production of the overload coupling. Beyond this the number of the parts/replacement parts can be reduced in accordance with the invention by elimination of the guard plate as a separate construction element.

BRIEF DESCRIPTION OF THE DRAWINGS

In the following the invention will be further described in greater detail in association with the figures. There is shown.

DETAILED DESCRIPTION OF THE INVENTION

Figure 1:
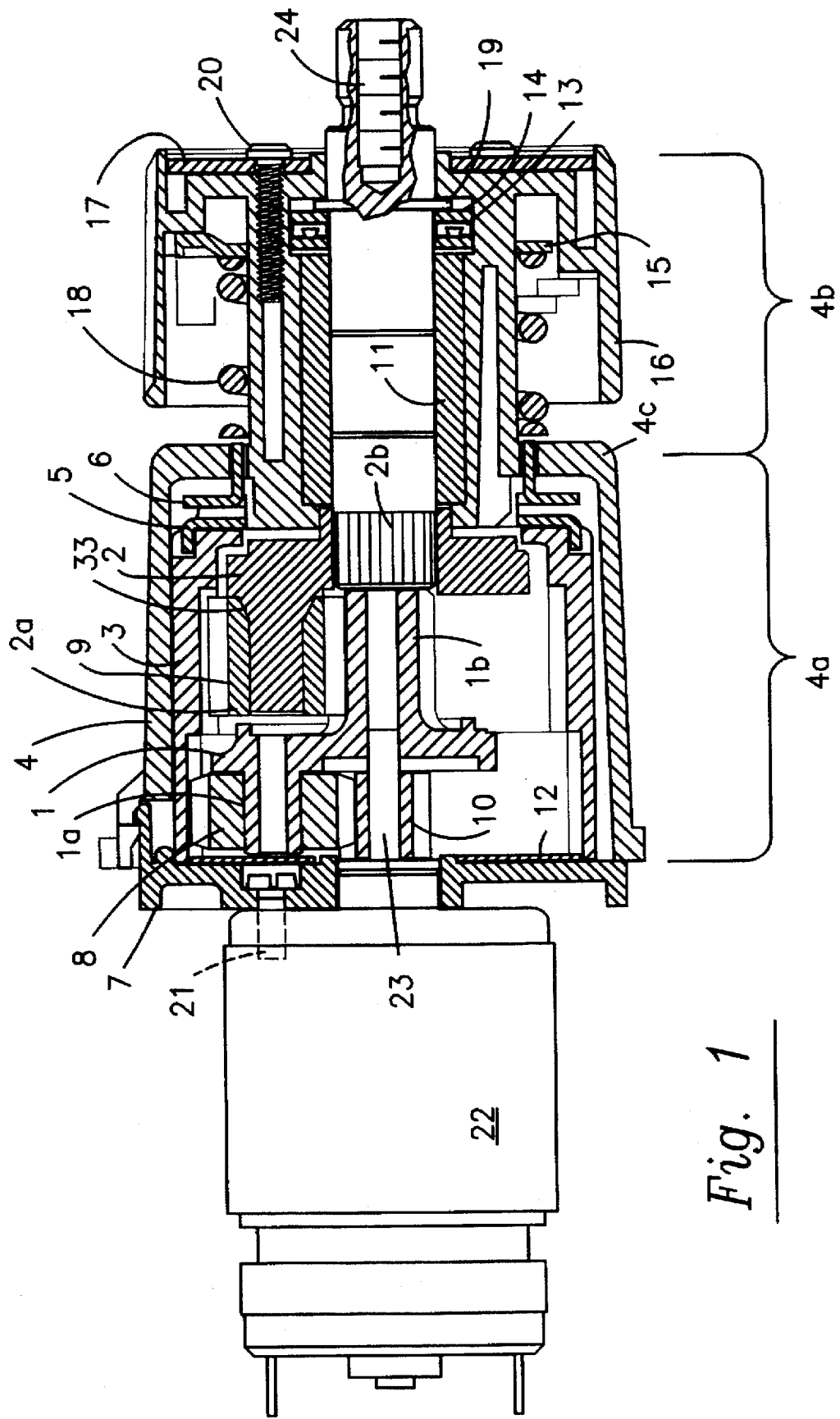
FIG. 1 a drive section for an accu-driver with a gear mechanism according to P 43 24 876.4, FIG. 2 an exploded view of the components annular gear, cam disk, pressure ring as well as pressure spring of a torque limiter device according to FIG. 1, FIG. 3 a planetary gear carrier with bulge like reinforcement provided within the gear mechanism of FIG. 1, and FIG. 4 a representation according to FIG. 2, however, with one piece constructed annular gear and cam plate.

In FIG. 1 a drive unit for an accu-driver is shown. The drive unit is comprised of an electrical motor 22 with a drive shaft 23 which projects into a drive housing 4. On one of the sides facing the drive shaft 23 of the electromotor 22 a motor flange 7 is fastened by means of cylinder screws 21. On this motor flange 7 there are preferably provided snap connections for retaining of the gear housing 4. Internal of the gear housing 4 an annular ring is provided, in order to effect a reduction in revolutions from the drive shaft 23 of the electro motor 22 to the output shaft 24. The drive shaft 23 and output shaft 24 are provided on a common axis A. On the output shaft 24 there is attached, in the case of an accu-screwdriver, a suitable and in FIG. 1 for reasons of better overview not shown screw chuck.

The gear housing 4 is, in the embodiment shown in FIG. 1, formed in the shape of a cylinder, whereby the gear housing in the front, the drive shaft 23 associated area 4a, has a greater diameter, than the rear area 4b, which is associated with the output shaft 24.

In the front area 4a there is provided within the gear housing 4 the already discussed planetary gear in the form of a two step planetary gear mechanism. This two step planetary gear consists of a first planet carrier 1 with three drill spindles 1a facing in the direction of the electromotor 22 as well as a planet gear carrier stem 1b, wherein the axis of the planet carrier stem is collinear with the axis of the drive- or as the case may be output-shaft A. On the drill spindle 1a of the first planet gear carrier 1 there are respectively rotatably mounted as planet wheels 8 toothed gear wheels, preferably constructed of plastic, which are in engagement with the motor pinion 10 provided on the drive shaft 23 of the electromotor 22. Although the first planet carrier 1 may in principal be provided with only a single drill spindle 1a, it is preferred in order to achieve a more even running to have multiple, preferably three, drill spindles 1a provided at intervals of 120° with respect to each other.

The planetary gear mechanism is comprised beyond this of a second planetary gear carrier 2 with preferably three drill spindles 2a. The planetary gear stem 2b of the second planetary gear carrier 2 is fixedly connected with respect to the output shaft 24. On the drill spindle 2a of the second planetary gear carrier 2 two planetary gears 9 are rotatably mounted, which are in engagement with the teeth provided on the planet carrier stem 1b of the first planet carrier 1.

In an embodiment of this type of the planetary gear as a two stage planetary gearing there is achieved a variable reduction with varying torque overload conditions. The translation of the two stages of the in FIG. 1 shown planetary gearing can, for this, for example, be so selected that the fundamental conversion of the first stage is 6:1 and the fundamental conversion of the second stage is 4.8:1.

For adaptation of the accu-screwdriver to various loads it is provided with a torque limitation device in the form of an overload coupling. This is comprised, in the embodiment shown in FIG. 1, of a cylinder like annular gear 3, a metallic cam disk 5, a metallic pressure element 6 as well as a pressure spring 18 constructed as a spiral spring. The annular gear 3 which is comprised of plastic, for example of polyamide 6.6 with mineral fillers, is seated inside the gear housing 4 and is provided with an stepped internal gearing, so that the planetary gears 8 of the first stage and the planetary gears 9 of the second stage of the planetary gearing are in engagement with the corresponding respective inner teething of the annular gear 3. The annular gear 3 is, through axial pressure of the pressure spring 18 transmitted through the pressure element 6 and the cam disk 5, pressed against a detente wall 12, here a detente disk of metal, which is provided within the gear housing 4 on the motor flange 7. This pressing force is adjustable by means of an adjustment ring 16 which can be adjusted by the operator of the accu-screwdriver. For this the pre-tensioning of the pressure spring 18 is adjustable by means of an curve built into the setting ring 16. Therewith the annular gear 3 is pressed against the detente wall 12 with a pressure from the pressure spring 18 via the pressure piece 6 and the cam disk 5. The annular gear 3 thereby remains fixed up to the point that the torque load of the accudriver exceeds the frictional force. Once the torque loading exceeds this value, the annular gear slips out and begins to rotate. In this way the torque limit of the gear according to the invention is established and thereby the screw is tightened up to the predetermined torque.

Figure 2:
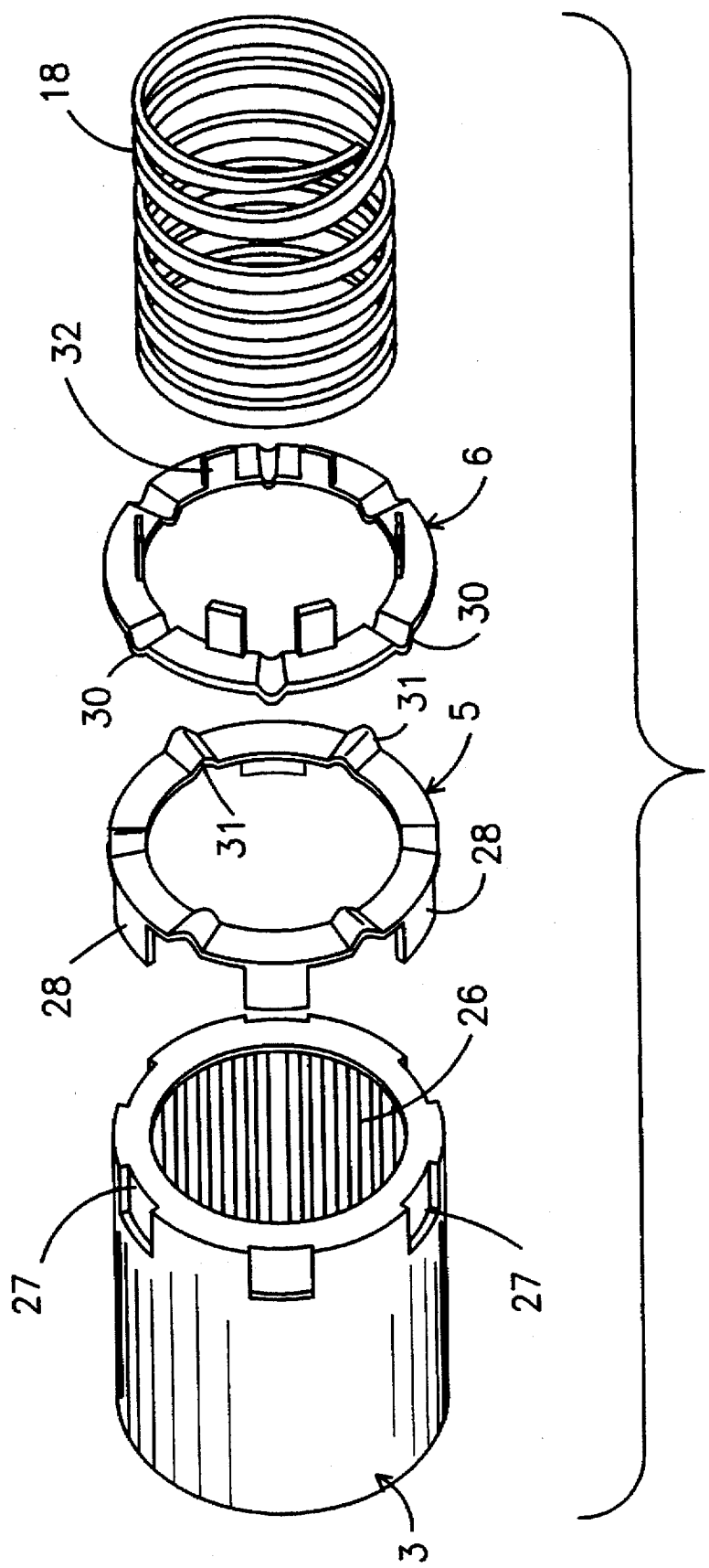

The arrangement of the annular gear 3, the cam disk 5, pressure piece 6 as well as the pressure spring 18 is explained in greater detail in association with FIG. 2.

In order to provide a more complete description it can be mentioned, that in the embodiment as shown in FIG. 1 the drive shaft 24 in the back area 46 of the gear housing 4 is surrounded by a spindle bearing 11, on the face side of which in the direction of the drive shaft 24 a ball cage 13 as well as an axial disk 14 is connected to a shaft securing ring 19. The above mentioned setting ring 16 is on its face side covered with a cover plate 17 and secured by means of screws 20 on the gear housing 4. Further, a spring spanning ring 15 is provided between the pressure spring 18 and the setting ring 16.

In FIG. 2 the annular gear 3, the metal cam disk 5, the pressure ring 6, as well as the pressure spring 18 is shown in exploded view. The annular gear 3 provided with internal gearing 26 is on the side of the metallic cam disk 5 provided with recesses 27, in which protrusions 28 of the cam disk engage, so that the cam disk 5 is connected to the annular gear 3 in a fixed relationship when assembled. The cam disk 5 and the pressure ring 6 are preferably formed as stamped pieces and exhibit on their respective facing surfaces wedging or engaging elements 30, 31. These engaging elements 30, 31 are shown in FIG. 2 as protruding projections 31 or 30 arranged ring-like on the cam ring 5 or as the case may be pressure ring 6. Upon the flat interfacing of the cam ring 5 or as the case may be pressure ring 6 these projections result in that a higher frictional resistance must be overcome before the annular gear 3 is caused by the torque load to be released and begins to revolve. The pressure ring 6 is provided with projections 32 projecting on side facing the pressure spring 18 axially in the direction of the pressure spring 18, upon which projections the pressure spring 18 exerts it's force. These projections 32 extend through openings in a radial wall section 4c (compare FIG. 1) of the gear housing 4, so that the pressure spring 18 which is provided outside of the gear housing 4 can exercise an axial pressure on the annular gear 3 provided inside the gear housing 4.

It is to be noted, that the arrangement according to the invention comprising a cam disk 5 and pressure disk 6 is not limited to the embodiment as represented in FIG. 2. A wide variety of other designs of cam disks 5 and pressure disks 6 can be used. So, for example, on the side of the cam disk 5 which opposes the pressure disk 6, basin like receptacles be provided and on the pressure disks 6 there can be provided spherical elevations. In the simplest case neither the cam disk 5 nor the pressure disk 6 is provided with engaging elements. However, in this case even a small torque load can cause a slipping.

Figure 3:
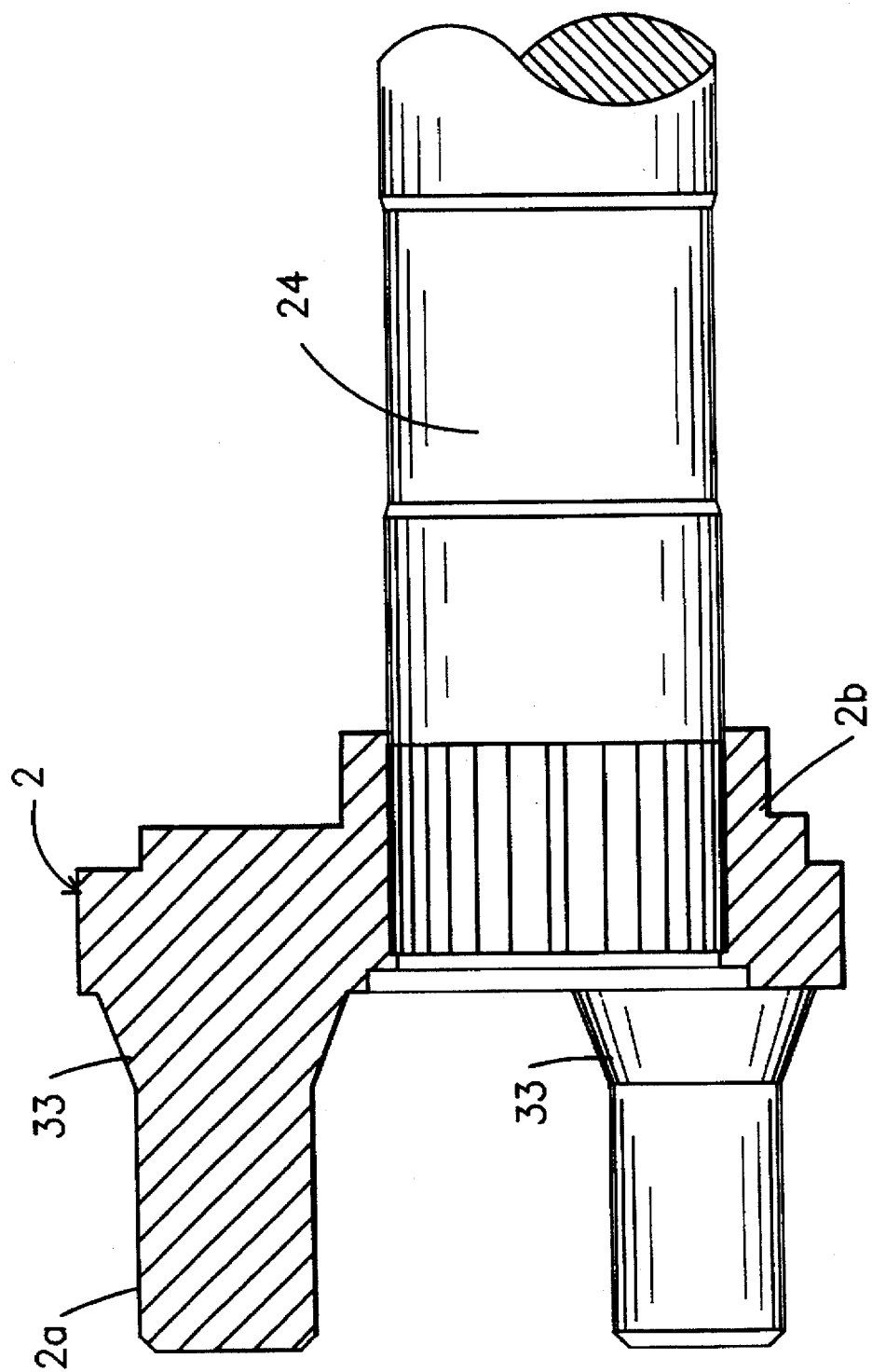

For increasing the mechanical stability of the gear mechanism of the present invention as shown in FIG. 1 at least one of the drill spindles 1a, 2a of the planet gear carrier 1, 2 is provided on it's end opposite the distal end, and so on the radial carrier part of the planetary gear carrier 1, 2 with a bulge-like reinforcement 33. In FIG. 3 this further development of the invention is clearly shown.

FIG. 3 shows the planetary gear carrier 2 of the gear as shown in FIG. 1 with drill spindle 2a and planetary gear stem 2b. The drill spindles 2a are designed to be strengthened at their seat, in that the drill spindles 2a are provided with bulge like reinforcements 33. A construction of this type of the planetary gear carriers 1, 2 results in a mechanical stiffening of the planetary gear carrier 1 or 2 and thereby increases their life span. A breaking off of the drill spindles 2a can thus effectively be prevented even at higher torque loading. Preferably these bulge-like reinforcements 33 are polished on their surface, in order to remove any microscopic cracks, during the production.

The gear housing 4 of FIG. 1 preferably comprises a cylindrical inner wall. In the area of the annular gear 3 the inner wall of the gear housing 4 is constructed to be partially conical, so that starting from the motor flange 12 [sic] and progressing in the direction to the cam disk 5 an increasing cleft between the annular gear outer wall and gear housing inner wall is formed, so that thereby an optimal lubricant reservoir is formed. The gear housing 4 can, for this purpose, be formed for example of four ring-like conical wall segments associated with each other, which are interrupted by wall segments having a constant inner diameter. This partial conical construction of the inner wall of the gear housing 4 is shown with shaded lines at the lower wall.

Although in connection with the illustrative embodiment there has been discussion of a metallic cam disk, the invention is in no way limited thereto. The cam disk can also be comprised of other materials, so long as the material exhibits a sufficient mechanical hardness.

Above and beyond this it is possible according to the invention to construct the cam disk and the annular gear as a single piece. This is described in greater detail with respect to FIG. 4.

Figure 4:
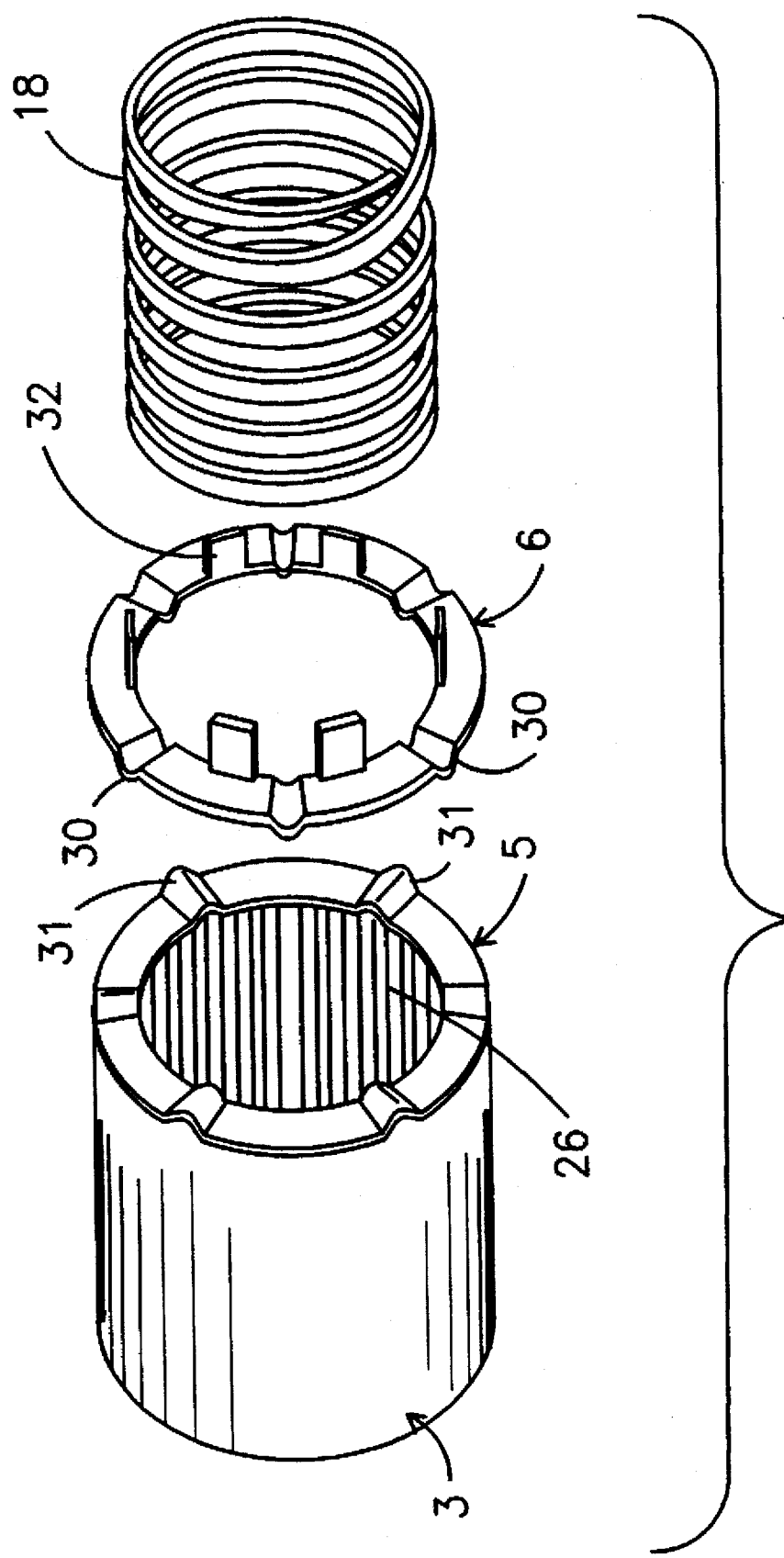

In FIG. 4, in which the same reference numerals are used to designate the same parts with the same meanings, cam disk 5, in contrast with the representation of FIG. 2, is formed as a single piece together with the annular gear 3. The cam disk 5 can be formed as a single piece with the annular gear 3 using, for example, injection molding. Therewith the cam disk 5, inclusive of the thereon formed engagement elements 31, is an integral component of the annular gear 3 and forms its face side. This area is surfaced with an abrasion resistant or at least largely wear resistant material. As materials there can be employed in particular metals or a ceramic powder, so that the pressures, which are transmitted during the over-racheting of the corresponding contact elements 30 and are borne by the pressure ring 6, does not result in a premature wearing away of the cam disk 5 and therewith the annular gear 3.

It has been found to be particularly preferable to provide several layers, one above the other, on the face side of the plastic constructed annular gear 3. Accordingly it has been found to be advantageous to first form on the annular gear 3 a receiving underlayer surface particularly compatible to the annular gear material. The wear resistant layer is then provided upon this receiving layer, upon which wear resistant surface the pressure ring 6 presses. For the receiving surface there can be employed, for example, aluminum oxide ($Al_2O_3$). As a suitable wear resistant layer, which can be brought upon this receiving surface and which forms the face of the annular gear 3, there can be employed a pure metal layer, a pure carbon based material or a metal-carbon material layer. As a pure metal layer there can be selected chrome-nickel-layers and copper-nickel-layers. Above and beyond this carbon-nitride-layers have been found to be suitable materials for these layers. Finally, also ceramic layers can be employed.

It has been found to be particularly preferable, due to the good adhesiveness to the synthetic or plastic material and the relatively low processing temperatures, to form the wear resistant layers by means of physical vapor deposition (PVD=physical vapor deposition) on the annular gear 3. As wear resistant layers there come into consideration titanium, TEFLON, chrome, nickel, copper, aluminium oxide, as well as also hard plastics.

Beyond this also a so-called chemical vapor deposition (CVD=chemical vapor deposition) has been found to be suitable for providing the layer. In the last named process it is however necessary to employ high temperatures, which must be taken in to consideration when selecting the plastic material for the annular gear. Beyond this it would also be possible to provide the materials by galvanic means.

It is to be noted, that the cam disk 5 shown in FIGS. 2 and 4 need not necessarily be provided with the indicated essentially in triangular shaped cross-section wedging elements. It has, in fact been determined that it is clearly also possible that the cam disk be formed as a slip ring with recesses, which work in cooperation with corresponding rolling elements such as for example rollers or ball bearings held against the pressure ring 6. Also here a long lasting protection is provided against wear which is imparted during rolling of the slip ring through the roller element, thanks to the wear resistant construction of the cam disk.

What is claimed is:

1. Gear mechanism comprising a gear housing (4), an annular gear (3) provided inside said gear housing, a planetary gearing (1, 2, 8, 9) provided internal of said annular gear (3) for reduction of rotations between a drive shaft (23) and an output shaft (24), said annular gear (3) provided with internal teeth which are in engagement with said planetary gearing, and an overload clutch provided between said annular gear and said output shaft, said overload clutch comprised of a cam surface (5) formed on the face of said annular gear and pressure ring (6) urged against said cam surface, wherein said annular ring (3) is formed of a plastic material, said annular gear (3) and cam surface (5) are formed as a single component of an injection moldable plastic material, and the face side of said annular disk, which forms the cam surface (5), is covered with a wear resistant material, and wherein said pressure ring (6) is secured against rotation with respect to said gear housing (4), said cam surface (5) and said pressure ring (6) facing each other and having engaging means provided on facing surfaces, a spring element (18) pressing against said pressure ring (6) from a side of said pressure ring opposite the side facing said cam surface (5), said pressure ring (6) pressing against said cam surface (5), said cam surface (5) formed intimately with said annular gear (3), and said annular gear (3) pressing against a detente wall (12), such that said annular gear (3) is frictionally prevented from rotation with respect to said detente wall (12) and said pressure ring (6) until a predetermined torque loading is exceeded, and wherein upon exceeding said predetermined torque load said annular gear (3) is able to rotate with respect to said pressure ring (6) and said detente wall (12).

2. Gear mechanism according to claim 1, wherein said wear resistant material is a metal.

3. Gear mechanism according to claim 1, wherein said wear resistant material is a ceramic material.

4. Gear mechanism according to claim 1, wherein said wear resistant material is a carbon-based material.

5. Gear mechanism according to claim 1, wherein a bonding layer is provided between the plastic of the annular gear and the wear resistant material.

6. Gear mechanism according to claim 5, wherein the bonding layer is aluminum oxide.

7. Gear mechanism according to claim 1, wherein said cam surface (5) is provided with wedging elements (31), which are formed as cams with an essentially triangular cross-section.

8. A gear mechanism according to claim 1, wherein said planetary gearing (1, 2, 8, 9) is comprised of at least a drive shaft (23) engaging an at least on one planetary gear carrier (1, 2) disposed planetary gear (8, 9), wherein the planetary gear carrier (1, 2) is provided in the area of the end of a drill spindle (1a, 2a) opposite to the distal end with a bulge-like reinforcement (33).

9. A gear mechanism according to claim 8, wherein said planetary gearing (1, 2, 8, 9) is provided in two reduction steps with respectively different reductions, and that the annular gear (3) has a stepped internal gearing (26) which is adapted to mesh respectively with the two steps.

10. A gear mechanism according to claim 1, wherein said gear housing (4) for receiving of the annular gear (39) is provided with an internal cylindrical wall which is conical at least in part.

11. An accumulator driven electrical power tool comprising a gear housing (4), an annular gear (3) provided inside said gear housing, a planetary gearing (1, 2, 8, 9) provided internal of said annular gear (3) for reduction of rotations between a drive shaft (23) and an output shaft (24), said annular gear (3) provided with internal teeth which are in engagement with said planetary gearing, and an overload clutch provided between said annular gear and said output shaft, said overload clutch comprised of a cam surface (5) formed on the face of said annular gear and pressure ring (6) urged against said cam surface, wherein said annular ring (3) is formed of a plastic material, said annular gear (3) and cam surface (5) are formed as a single component of an injection moldable plastic material, and the face side of said annular disk, which forms the cam surface (5), is covered with a wear resistant material, and wherein said pressure ring (6) is secured against rotation with respect to said gear housing (4), said cam surface (5) and said pressure ring (6) facing each other and having engaging means provided on facing surfaces, a spring element (18) pressing against said pressure ring (6) from a side of said pressure ring opposite the side facing said cam surface (5), said pressure ring (6) pressing against said cam surface (5), said cam surface (5) formed intimately with said annular gear (3), and said annular gear (3) pressing against a detents wall (12), such that said annular gear (3) is frictionally prevented from rotation with respect to said detents wall (12) and said pressure ring (6) until a predetermined torque loading is exceeded, and wherein upon exceeding said predetermined torque load said annular gear (3) is able to rotate with respect to said pressure ring (6) and said detente wall (12).

12. An accumulator driven electrical power tool as in claim 11, wherein said power tool is an electric drill.

13. An accumulator driven electrical power tool as in claim 11, wherein said power tool is an electric screw driver tool.

* * * * *